United States Patent [19]

Hirai et al.

[11] Patent Number: 5,422,034

[45] Date of Patent: Jun. 6, 1995

[54] PURIFICATION OF LIQUID CRYSTALS AND LIQUID CRYSTAL COMPOSITION

[75] Inventors: Osamu Hirai, Hitachi; Noriji Tashiro, Mito; Osamu Watanabe, Hitachi; Hiroshi Nishizawa, Kitaibaraki; Kenji Suzuki, Hitachi, all of Japan

[73] Assignee: Hitachi Chemical Company, Ltd., Tokyo, Japan

[21] Appl. No.: 164,710

[22] Filed: Dec. 10, 1993

[30] Foreign Application Priority Data

Dec. 16, 1992 [JP] Japan .................................. 4-335961
Dec. 25, 1992 [JP] Japan .................................. 4-346782
Feb. 12, 1993 [JP] Japan .................................. 5-023140

[51] Int. Cl.$^6$ ...................... C09K 19/52; C09K 19/00; G02F 1/13
[52] U.S. Cl. ................................. 252/299.01; 428/1; 359/103
[58] Field of Search ....................... 252/299.01; 428/1; 359/103

[56] References Cited

U.S. PATENT DOCUMENTS 4,464,489  8/1984  Noda et al. ........................... 521/117
4,520,071  5/1985  Noda et al. ........................... 428/402
5,053,480 10/1991  Kato et al. ........................... 528/188
5,288,426  2/1994  Itoh et al. ........................... 252/299.5

OTHER PUBLICATIONS

Database WPI Week 9243 An 92-354899.
Database WPI Week 8919 An 89-142056.
Database WPI Week 8022 An 80-39177c.
Database WPI Week 8414 An 84-085865.
Patent Abstracts of Japan; vol. 16, No. 327 p. 1387 (Jul. 1992).
Database WPI Week 8307 An 83-15973k.
Database WPI Week 8305 An 83-10411k.
Database WPI Week 8736 An 87-252970.
Database WPI Week 8743 An 87-301828.

*Primary Examiner*—Shean Wu
*Attorney, Agent, or Firm*—Antonelli, Terry, Stout & Kraus

[57] ABSTRACT

Liquid crystals purified by treating with porous particles of a compound having one or more imide groups, or a liquid crystal composition comprising one or more liquid crystals and porous particles of a compound having one or more imide groups can provide a liquid crystal cell having a high voltage retention rate and a liquid crystal display device having high display properties.

9 Claims, 3 Drawing Sheets

PURIFICATION OF LIQUID CRYSTALS AND LIQUID CRYSTAL COMPOSITION

BACKGROUND OF THE INVENTION

This invention relates to a process for producing purified liquid crystals, a liquid crystal composition, and a liquid crystal cell and a liquid crystal display device using these purified liquid crystals and the liquid crystal composition.

In order to improve display properties of liquid crystal display devices, it is important to improve the resistivity of liquid crystals and to improve the voltage retention rate of liquid crystal cells. But liquid crystal cells and liquid crystal display devices now used have a problem in that ionic impurities are adsorbed on orientation films made from a polyimide and deteriorate display properties. In order to remove such ionic impurities, various methods are proposed using liquid crystal purifying material. For example, Japanese Patent Unexamined Publication (JP-A) No. 64-87685 discloses a process for removing impurities using an adsorbent such as silica gel, alumina, porous polymer beads made from styrene-divinylbenzene copolymer, ion exchange resins, etc. But since the adsorption ability is so strong, the adsorbent adsorbs not only ionic impurities which are adsorbed on polyimide orientation film and deteriorate liquid crystal display properties, but also other additives such as liquid crystal mixtures having polar groups, chiral agents, etc., resulting in changing the liquid crystal composition and deteriorating the display properties.

On the other hand, when the resistivity of liquid crystals and the voltage retention rate were lowered by contamination of liquid crystals at the time of insertion into a liquid crystal cell or a liquid crystal display device, it was difficult to recover these properties. In order to solve such a problem, JP-A 4-258925 discloses a device for inserting liquid crystals having a liquid crystal reservoir, inner wall of which is covered with a polyimide resin in order to remove impurities by adsorbing on the polyimide resin. But since the contact area with liquid crystals is small, the removal of impurities is insufficient, resulting in failing to obtain long-period display stability, particularly under high temperature circumstances (40°–80° C.) Further, even if the polyimide resin was ground to a powder, the specific surface area was still insufficient to remove the impurities.

SUMMARY OF THE INVENTION

It is an object of the present invention to provide a process for producing purified liquid crystals by selectively removing impurities which give undesirable influences on orientation films using porous particles of imide group-containing compound. It is another object of the present invention to provide a liquid crystal composition removing undesirable impurities.

The present invention provides a process for producing purified liquid crystals which comprises treating liquid crystals with porous particles of an imide group-containing compound.

The present invention also provides a liquid crystal composition comprising liquid crystals and porous particles of an imide group-containing compound.

The present invention further provides a liquid crystal cell or a liquid crystal display device containing such purified liquid crystals or such a liquid crystal composition.

DESCRIPTION OF THE PREFERRED EMBODIMENTS

Figure 1:
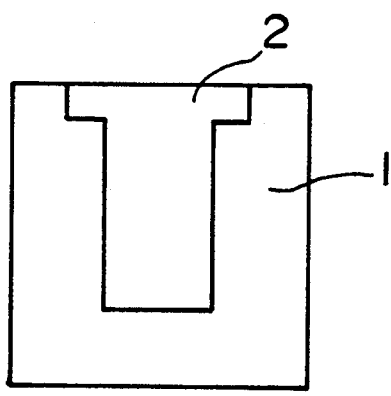
FIG. 1 is a plane view of an ITO transparent electrode pattern used in Examples.

According to the present invention, liquid crystals are purified by treating (or contacting) liquid crystals with porous particles of an imide group-containing compound. The resulting purified liquid crystals show long-period display stability, particularly at high temperatures (40°–80° C.), and a lost amount during the purification is very small.

As the liquid crystals to be purified, there can be used conventionally used liquid crystals usable in display devices, for example, nematic liquid crystals, cholestic liquid crystals, and smectic liquid crystals of Schiff bases, azos, azoxys, benzoic acid esters, biphenyls, terphenyls, cyclohexylcarboxylic acid esters, phenylcyclohexanes, biphenylcyclohexanes, pyrimidines, dioxanes, cyclohexylcyclohexane esters, cyclohexylethanes, cyclohexanes, tolans, alkenyls, 2,3-difluorophenylenes, etc. These liquid crystals can be purified alone or as a mixture thereof.

As the imide group-containing compound, there can be used polyimides obtained by reacting a tetracarboxylic dianhydride with a diamine, polyimides obtained by reacting a tetracarboxylic dianhydride with a diisocyanate, polyamideimides obtained by reacting a tricarboxylic monoanhydride with a diamine or a diisocyanate, bismaleimide polymers, etc. so long as they are not dissolved in liquid crystals.

The polyimides obtained by reacting a tetracarboxylic dianhydride with a diamine or diisocyanate have repeating units of the formulae (1) to (3);

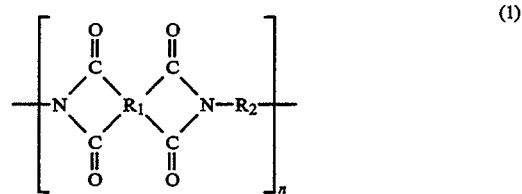
(1)

wherein $R_1$ is a tetravalent organic group; $R_2$ is a divalent organic group; and n is an integer larger than 1,

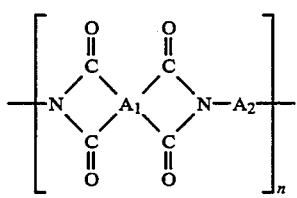
(2)

wherein $A_1$ is a tetravalent aromatic residue; $A_2$ is a divalent aromatic residue, and m is an integer larger than 1,

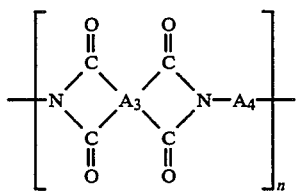
(3)

wherein $A_3$ is

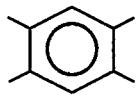

or

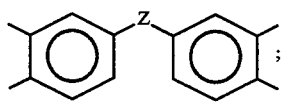

Z is —$CH_2$—,

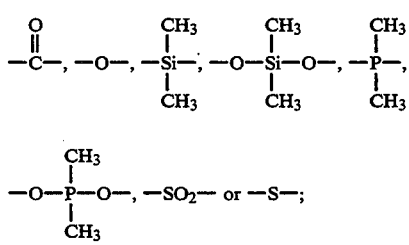

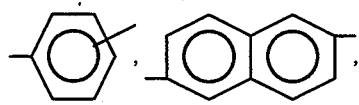

$A_4$ is

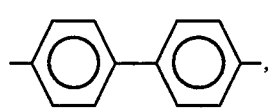

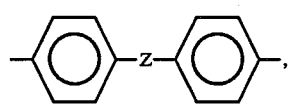

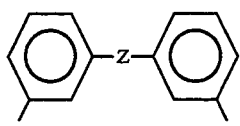

or

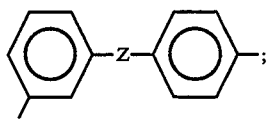

Z is as defined above; and p is an integer larger than 1.

The polyamideimides obtained by reacting a tricarboxylic anhydride with a diamine or a diisocyanate have repeating units of the formula:

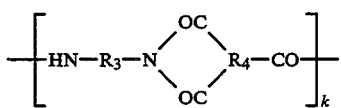
(4)

wherein $R_3$ is a divalent organic group; $R_4$ is a trivalent organic group; and k is an integer larger than 1.

Among these polymers, those having the repeating units of the formulae (2) and (3) are preferable, and the formula (3) is more preferable.

As the tetracarboxylic dianhydrides, there can be used the following compounds.

Aromatic tetracarboxylic dianhydrides:
pyromellitic dianhydride,
3,3′,4,4′,-benzophenonetetracarboxylic dianhydride,
3,3′,4,4′,-biphenyltetracarboxylic dianhydride,
1,2,5,6-naphthalenetetracarboxylic dianhydride,
2,3,6,7-naphthalenetetracarboxylic dianhydride,
2,3,5,6-pyridinetetracarboxylic dianhydride,
1,4,5,8-naphthalenetetracarboxylic dianhydride,
3,4,9,10-perrylenetetracarboxylic dianhydride,
4,4′,-sulfonyldiphthalic dianhydride,
m-terphenyl-3,3″,4,4″-tetracarboxylic dianhydride,
4,4′,-oxydiphthalic dianhydride,
1,1,1,3,3,3-hexafluoro-2,2-bis(2,3- or 3,4-dicarboxyphenyl)propane dianhydride,
2,2-bis(2,3- or 3,4-dicarboxyphenyl)propane dianhydride,
2,2-bis[4-(2,3- or 3,4-dicarboxyphenoxy)phenyl]propane dianhydride,
1,1,1,3,3,3-hexafluoro-2,2-bis[4-(2,3- or 3,4-dicarboxyphenoxy)phenyl]propane dianhydride,
1,3-bis(3,4-dicarboxyphenyl)-1,1,3,3-tetramethyldisiloxane dianhydride, etc.

Reduced compounds of these aromatic tetracarboxylic dianhydrides with hydrogen.

Alicyclic tetracarboxylic dianhydrides of the formulae:

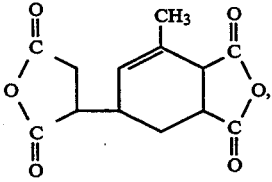

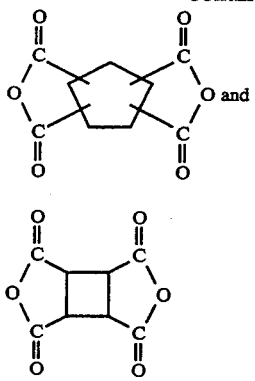

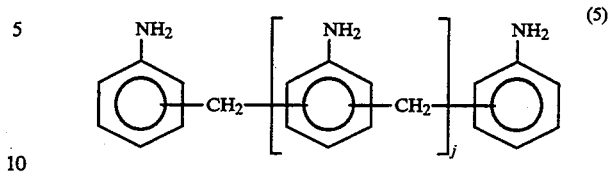

wherein j is 0 or an integer of 1 to 9.

These tetracarboxylic dianhydrides can be used singly or as a mixture thereof. Among them, the use of aromatic tetracarboxylic dianhydrides is preferable.

As the diamines, there can be used aliphatic diamines, alicyclic diamines, heterocyclic diamines, aromatic diamines, silicone diamines, etc. Among them, aromatic diamines and alicyclic diamines obtained by reducing aromatic diamines with hydrogen are preferable.

Examples of aromatic diamines are as follows:
4,4'-diaminodiphenyl ether,
3,4'-diaminodiphenyl ether,
4,4'-diaminodiphenylmethane,
4,4'-methylene-bis-(2,6-dimethylaniline),
4,4'-methylene-bis-(2,6-diethylaniline),
4,4'-methylene-bis-(2-methyl-6-ethylaniline),
4,4'-diaminodiphenylsulfone,
3,3'-diaminodiphenylsulfone,
4,4'-benzophenonediamine,
3,3'-benzophenonediamine,
meta-phenylenediamine,
para-phenylenediamine,
4,4'-di(4-aminophenoxy)phenylsulfone,
4,4'-di(3-aminophenoxy)phenylsulfone,
4,4'-di(4-aminophenoxy)benzene,
3,3'-di(4-aminophenoxy)benzene,
4,4'-di(3-aminophenoxy)benzene,
2,4-diaminotoluene,
2,6-diaminotoluene,
4,4'-diaminodiphenylpropane,
4,4'-diaminophenyl,
2,2-bis[4-(4-aminophenoxy)phenyl]propane,
2,2-bis[4-(3-aminophenoxy)phenyl]propane,
1,1,1,3,3,3-hexafluoro-2,2-bis[4-(4-aminophenoxy)phenyl]propane, etc.

Among these aromatic diamines, the following ones are more preferable.
4,4'-diaminodiphenyl ether,
4,4'-diaminodiphenylmethane,
4,4'-benzophenonediamine,
4,4'-diaminodiphenylsulfone,
2,2-bis[4-(4-aminophenoxy)phenyl]propane,
4,4'-methylene-bis-(2,6-dimethylaniline),
4,4'-methylene-bis-(2,6-diethylaniline), and
4,4'-methylene-bis-(2-methyl-6-ethylaniline).

When a polyamine having three or more functionalities is used as a part of the above-mentioned diamines, there can be obtained a cross-likable polyimide resin. Examples of such a polyamine are aromatic triamines such as 1,2,4-triaminobenzene, etc.; aromatic tetraamines such as 1,2,4,5-tetraaminobenzene, 4,4'-diaminobenzidine, etc.; aromatic polyamines of the formula:

As the diisocyanates, there can be used diisocyanates obtained by reacting the above-mentioned diamines with phosgene or thionyl chloride; isocyanurate ring-containing polyisocyanates obtained by trimerization reaction of polyisocyanate or diisocyanate obtained by treating a polyamine similarly; aromatic diisocyanates such as 4,4'-diphenylmethane diisocyanate, 4,4'-diphenyl ether diisocyanate, 3,3'-dimethyldiphenyl-4,4'-diisocyanate, tolylene diisocyanate, etc.; carbodiimido group-containing aromatic diisocyanates obtained by condensation reaction of the aromatic diisocyanates; and isocyanurate ring-containing polyisocyanates obtained by condensation reaction of these aromatic diisocyanates.

As the tricarboxylic anhydride, there can be used reactive acid derivatives of trimellitic acid such as trimellitic anhydride, trimellitic anhydride monochloride, 1,4-dicarboxy-3-N,N-dimethylcarbamoylbenzene, 1,4-dicarboxy-3-carbophenoxybenzene, 1,4-dicarboxymethoxy-3-carboxybenzene, ammonium salts of trimellitic acid using ammonia, dimethylamine, triethylamine, etc. The use of trimellitic anhydride and trimellitic anhydride monochloride is more preferable.

The polyimides and polyamideimides can include repeating units (e.g. branched repeating units, cross-linked repeating units) other than those of the formulae (1) to (4).

Examples of the bismaleimide polymers are polymers of 4,4'-bismaleimidediphenylmethane, 2,2-bis[4-(4-maleimidephenoxy)phenyl]propane, bis[4-(3maleimidephenoxy)phenyl]sulfone, 3,4'-bismaleimidediphenyl ether, 1,2-bis(4-maleimidephenoxy)ethane, 1,2-bis[2-(4-maleimidephenoxy)ethoxy]ethane, 1,6-bis-maleimidehexane, etc.

Figure 6:
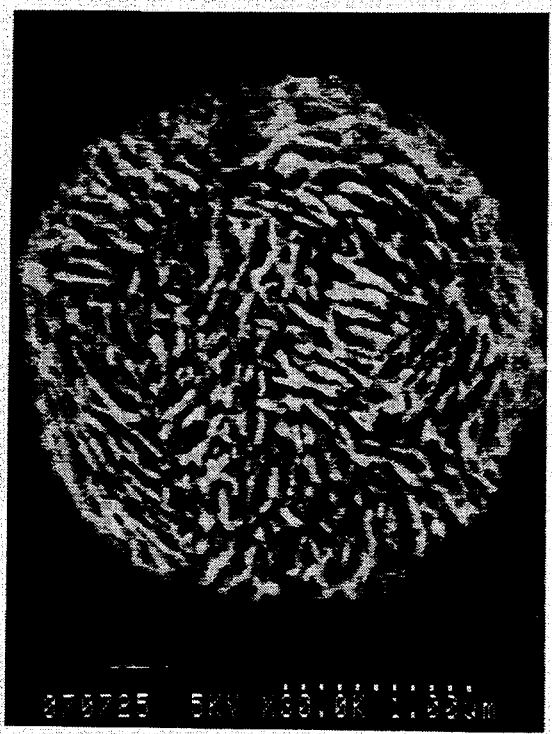
FIG. 6 is a photograph of a porous particle of polyimide used in Example 2.

In order to purify liquid crystals effectively, the imido group-containing compound should be used in the form of porous particles. The words "porous particles" means porous spheres or sphere-like bodies or pseudo-spheres having a large specific surface area and a number of wrinkles or lamellas on the surfaces thereof as shown in FIG. 6.

Such porous particles of imido group-containing compound can be produced by a process wherein a solution of an imido group-containing compound is added to a poor solvent and fine particles are made under high shearing, a process wherein a solution of an imido group-containing compound is spray dried, a process wherein fine particles formed by passing through small holes are recovered (a membrane emulsifying method, JP-A 2-95433), or a direct synthesis process such as non-aqueous dispersion polymerization of starting materials of the polyimides and polyamideimides having repeating units of the formulae (1) to (4) (Japanese Patent Examined Publication No. 60-48531, JP-A 59-230018), dispersion polymerization of these starting materials (JP-A 59-108030, 60-221425, 63-277241), etc.

More in detail, there can preferably be used porous particles of polyimide obtained by reacting a tetracarboxylic dianhydride with a diamine in a solvent which does not dissolve produced polyimide particles, and porous particles of polyimide obtained by reacting a tetracarboxylic dianhydride with a diisocyanate in a solvent which does not dissolve produced polyimide. More preferably, there are used porous particles of polyimide obtained by dispersion polymerization of an aromatic tetracarboxylic dianhydride and an aromatic diamine in a solvent which does not dissolve resulting polyimide particles. Such porous particles of polyimide can be produced by uniformly dissolving almost equimolar amounts of an aromatic tetracarboxylic dianhydride and an aromatic diamine, and 10 to 200% by mole of water per mole of the tetracarboxylic dianhydride in a basic solvent (e.g. N-methyl pyrrolidone, N,N-dimethylformamide, N,N-dimethylacetamide) at a temperature lower than 150° C., and carrying out the reaction at 150° to 300° C.

The polyimides having repeating units of the formulae (1) to (3) and the polyamideimides having repeating units of the formula (4) may further contain one or more carboxyl groups or amide acid groups in the main molecular chain.

The average particle size of porous particles of the imido group-containing compound is not particularly limited. But, when the average particle size is too small, there is a tendency to worsen the workability at the time of filtration and decantation, and also to worsen permeability in the case of packing the porous particles in a column. On the other hand, when the average particle size is too large, there is a tendency to lower the specific surface area and to lessen the effect for improving the purification of liquid crystals and the voltage retention rate. Therefore, the average particle size is preferably 0.1 to 5,000 μm, more preferably 1 to 5,000 μm.

As to the specific surface area of the porous particles of the imido group-containing compound, when it is too small, there is a tendency to lessen the effect of improving the purification of liquid crystals and the voltage retention rate. To obtain better effects, the specific surface area is preferably 1 $m^2/g$ or more, more preferably 5 $m^2/g$ or more, particularly preferably 10 $m^2/g$ or more, and extremely particularly preferably 20 $m^2/g$ or more. The upper limit of the specific surface area is not particularly limited, but usually about 5,000 $m^2/g$.

Control of the average particle size and the specific surface area of the imido group-containing compound can be conducted by applying proper conditions at the time of production of porous particles (e.g. the kind of solvent, combination of solvents, using amounts of solvents, stirring conditions, reaction time, reaction temperature, precipitation conditions, etc.).

The term "treating" in the purification process means any ways which can conduct purification of liquid crystals, wherein the liquid crystals are contacted with the porous particles of imido group-containing compound. The treating method includes, for example, a batch method and a column method.

According to the batch method, liquid crystals and porous particles of imido group-containing compound are charged in a proper vessel and, if necessary, stirred, followed by separation of the porous particles of imido group-containing compound to give purified liquid crystals.

As to the mixing ratio of the liquid crystals and the porous particles of imido group-containing compound (hereinafter referred to as "porous particles") in the batch method, when the amount of the porous particles is too small, there is a tendency to lower the improving effect of purification of liquid crystals and the voltage retention rate of a liquid crystal cell. On the other hand, when the amount of the porous particles is too large, there is a tendency to increase the absorbed amount of liquid crystals on the porous particles, resulting in causing an undesirable loss of liquid crystals. Therefore, it is preferable to use the porous particles in an amount of 0.01 to 30% by weight based on the weight of liquid crystals.

The treating time in the batch method is preferably 10 seconds or more, since there is a tendency to lower the improving effect of the voltage retention rate of a liquid crystal cell when the treating (or contacting) time is too short.

The treating temperature in the batch method is preferably above the melting point of liquid crystals without causing any problems. But when the temperature is too high, there is a possibility of decomposing the liquid crystals and the porous powders.

In the batch method, the separation of the porous particles from the mixture of liquid crystals and the porous particles can be carried out by a filtration method, a decantation method, and the like.

According to the column method, the porous particles are packed in a proper vessel to form a column and liquid crystals are passed through the column to give purified liquid crystals.

In the column method, the liquid crystals can pass through the column either by natural flow by gravity or flow using a pump.

As to the flow rate in the column method, when the flow rate in too fast, there is a tendency to lower the improving effect of the purification of liquid crystals and the voltage retention rate of a liquid crystal cell. On the other hand, when the flow rate is too slow, there is a tendency to worsen the treating efficiency. Preferable flow rate is in the range of 0.0001 cm/min to 100 cm/min in terms of linear velocity.

The present invention also provide a liquid crystal composition comprising liquid crystals and porous particles of an imido group-containing compound. As the liquid crystals, those mentioned above can be used. Further, as the porous particles of an imido group-containing compound, there can be used those mentioned above can be used.

The liquid crystal composition mentioned above can be obtained by mixing the liquid crystals and the imido group-containing compound in a vessel such as a beaker, followed by insertion of the liquid crystal composition into a cell to form a liquid crystal cell. Alternatively, porous particles of imido group-containing compound are dispersed on glass substrates like a liquid crystal spacer, and the glass substrates are used for forming a cell, into which liquid crystals are inserted to finally form a liquid crystal cell in which the liquid crystal composition is consequently formed.

As to the mixing ratio in the liquid crystal composition, when the amount of the porous particles of imido group-containing compound is too small, there is a tendency to lower the effect of preventing the lowering of resistivity of liquid crystals and to lower the effect of preventing the lowering of voltage retention rate of a liquid crystal cell. On the other hand, when the amount of the porous particles of imido group-containing compound is too large, the image quality of the cell becomes worse due to the small amount of liquid crystal phase. Considering the above facts, it is preferable to use the porous particles of imido group-containing compound in an amount of $10^{-10}$ to $10^{-3}\%$ by weight based on the weight of the liquid crystal.

The liquid crystal cell of the present invention is obtained by inserting the liquid crystals purified as mentioned above, or the liquid crystal composition, mentioned above into a cell structure obtained by a conventional method (e.g. Matsumoto and Tsunoda, "Fundamental and Application of Liquid Crystals", published by Kogyo Chosa-kai, 1991).

For example, an indium tin oxide (ITO) transparent electrode is formed on a glass substrate by a sputtering method, etc. Then, a varnish of polyimide or a precursor thereof is coated on the ITO transparent electrode for film formation, dried and, if necessary, rubbed to form an orientation film. A pair of thus obtained glass substrates are placed oppositely so as to face the orientation films each other. The periphery of the glass substrates are sealed with a sealing pattern and the purified liquid crystals or the liquid crystal composition is inserted into the resulting cavity to give the liquid crystal cell.

On the other hand, the liquid crystal display device comprising, e.g. two substantially parallel spaced plates; a frame sealed between said plates and defining a tight chamber therebetween; control electrodes arranged on the inner facing surfaces of said plates for providing an electric field therebetween; a coating of alignment material (e.g. polyimide, etc.) covering said inner surfaces and said electrodes; and a liquid crystal mixture, can be formed by a conventional method, e.g. as mentioned above, by inserting the purified liquid crystals or the liquid crystal composition mentioned above thereinto. The liquid crystal display device includes a segment type display and a matrix type display, and the matrix type display includes a simple matrix type display and an active matrix type display.

According to the present invention, the resistivity of liquid crystals and the voltage retention rate of a liquid crystal cell can be improved remarkably.

The resistivity influences remarkably on display properties of liquid crystal displays. Generally speaking, higher resistivity makes display properties better. In practical use, the resistivity is influenced by the kind of liquid crystals, required properties for the driving method of liquid crystal displays, required price, and the like. In the case of TFT driving active matrix type colored liquid crystal displays which are required to have properties satisfying severe requirements, the resistivity is preferably $10^{12}$ $\Omega\cdot$cm or more.

As to the voltage retention rate, which influences the display properties of liquid crystal displays greatly, the higher value gives better display properties. The voltage retention rate is, in practice, influenced by the kind of liquid crystals, required properties for the driving method of liquid crystal displays, required price, and the like. In the case of TFT driving active matrix type colored liquid crystal displays which are required to have properties satisfying severe requirements, the voltage retention rate is preferably 84% or more at 16.5 ms (frame frequency 60 Hz) when a 5 V rectangular-current impulse with a pulse width of 100 $\mu$m is applied at a measuring temperature of 23° C. (room temperature).

The present invention is illustrated by way of the following Examples.

Example 1

(1) Preparation of porous particles of imido group-containing compound

In a 3-liter four-necked flask equipped with a thermometer, a stirrer and an Allihn condenser, 218 g (1 mole) of pyromellitic dianhydride, and 200 g (1 mole) of 4,4'-diaminodiphenyl ether dissolved in 673 g of N-methyl pyrrolidone were reacted at 25° C. for 4 hours while passing a nitrogen gas therethrough, followed by 1 hour's reaction at 80° C. The resulting resin solution was poured into 5 liters of water to yield porous particles having an average particle size of 100 $\mu$m. The resulting particles were dried at 200° C. for 3 hours to give an imido group-containing compound having an average particle size of 100 $\mu$m. The porous particles had a specific surface area of 5 m$^2$/g (BET method, Sorptomatic 1800 type, mfd. by Carloerba Strumentazione). In the infrared absorption spectrum, the special absorption due to imido group at 1700 cm$^{-1}$ was admitted remarkably.

(2) Treatment of liquid crystals with the imido group-containing compound

In a 10-ml glass beaker containing 5 g of liquid crystals (ZLI-4792, a trade name, mfd. by Merck Japan Ltd.), 0.5 g of porous particles of the imido group-containing compound obtained in above (1) was placed and stirred for 1 hour at room temperature using a magnetic stirrer. After removing the porous particles by filtration, there were obtained purified liquid crystals.

(3) Measurement of degree of purification of liquid crystals

As a measure for the degree of purification of liquid crystals, the resistivity of liquid crystals was measured using an electrode for liquid electrode (LE-21, a trade name, mfd. by Ando Electric Co., Ltd.) at room temperature. The results are shown in Table 1.

(4) Measurement of voltage retention rate of liquid crystal cell

Figure 2:
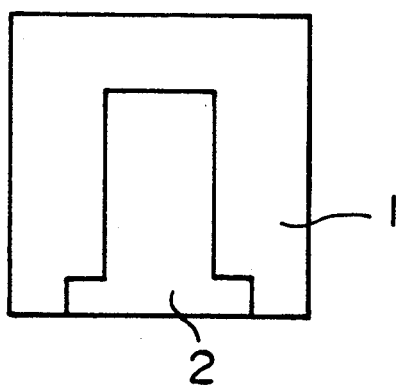
FIG. 2 is a plane view of another ITO transparent electrode pattern used in Examples.
Figure 3:
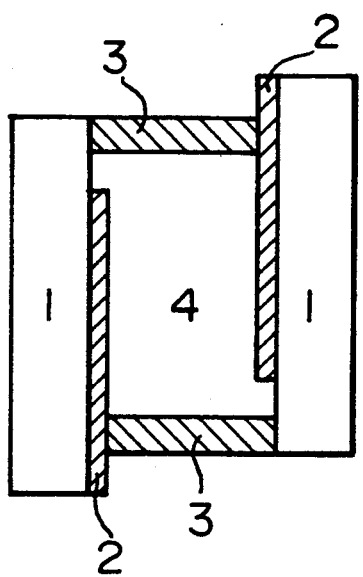
FIG. 3 is a cross-sectional view of a liquid crystal cell produced in Examples.
Figure 4:
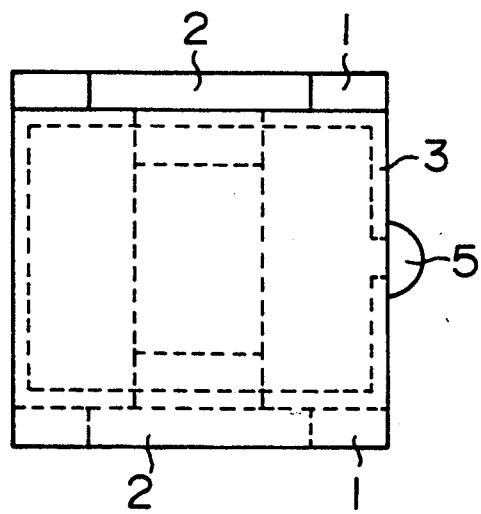
FIG. 4 is a top view of a liquid crystal cell produced in Examples.

On a glass substrate (30 mm×30 mm×0.1 mm), a predetermined ITO transparent electrode was formed by a sputtering method. This pattern is shown in FIGS. 1 and 2, wherein numeral 1 denotes a glass substrate, and numeral 2 denotes an ITO transparent electrode. A pair of thus produced glass substrates were placed in parallel so as to face the ITO transparent electrodes each other and the peripheries thereof were sealed with an epoxy thermosetting adhesive (resin: SE-4500 clear, a trade name, mfd. by HAVEN Chemical Co.; hardener: SE-4500 CATALYST, a trade name, mfd. by HAVEN Chemical Co.). In order to maintain the gap between the two glass substrate constant, plastic particles having a diameter of 5.0 $\mu$m were placed therebetween as a spacer. Into the resulting cavity, the purified liquid crystals obtained in above (2) were inserted by a vacuum impregnation method. The input was sealed using a UV curable resin (Three Bond 3052, a trade name, mfd. by Three Bond Co.) as a sealant to give a liquid crystal cell shown in FIGS. 3 and 4, wherein numeral 3 denotes a seal pattern, numeral 4 is liquid crystals, numeral 5 is a sealant and numerals 1 and 2 are as explained above.

Figure 5:
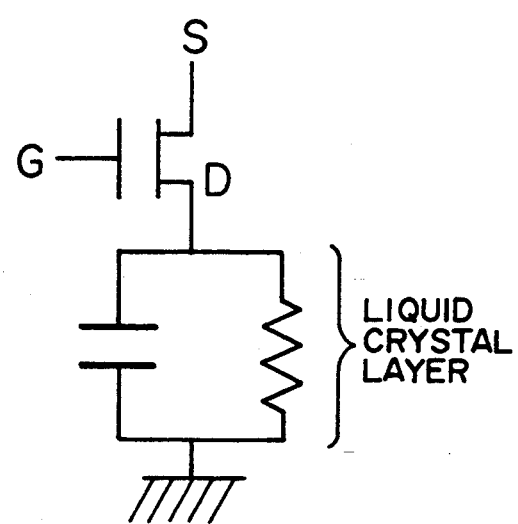
FIG. 5 is a rough sketch of an apparatus for measuring a voltage retention rate.

Using the resulting liquid crystal cell, the voltage retention rate was measured. The voltage retention rate was measured by applying a pulse voltage using a model circuit shown in FIG. 5 in a state of monitoring the voltage between ITO electrodes of both glass substrates using a digital memory scope and measuring changes of the voltage between ITO electrodes. More concretely, a gate signal of a voltage of 10 V with a pulse width of 30 μsec. was input between the gate G and source S in the model circuit in FIG. 5 and changes of the drain voltage VD were measured to obtain the root-mean-square value of the wave form on the scope. From said value, the voltage retention rate was calculated by the following equation:

$$\text{Voltage retention rate} = \frac{\left(\begin{array}{c}\text{Drain wave root-}\\ \text{mean-sqruare value }(V)\end{array}\right)}{5(V)} \times 100(\%)$$

(5) Display ability of liquid crystal display device

An active driving type liquid crystal display device was formed using the purified liquid crystals obtained in above (2) and a polyimide as an orientation film (Active Matrix type orientation film LQ-T210, a trade name, mfd. by Hitachi Chemical Co., Ltd.). Display properties (particularly display uniformity) were remarkably excellent.

COMPARATIVE EXAMPLE 1

Figure 7:
FIG. 7 is a photograph of active alumina used in Comparative Example 1.

The process of Example 1 was repeated except for using active alumina (for column chromatography, 200 mesh, mfd. by Wako Pure Chemical Industries, Ltd., FIG. 7 with 500 magnifications) in place of the porous particles of imido group-containing compound. The results are shown in Table 1.

COMPARATIVE EXAMPLE 2

The process of Example 1 was repeated except for omitting the treatment with porous particles of imido group-containing compound. The results are shown in Table 1.

TABLE 1

|  | Resistivity (Ω · cm) | Voltage retention rate (%) |
| --- | --- | --- |
| Example 1 | $1.0 \times 10^{12}$ | 84.5 |
| Comparative Example 1 | $5.7 \times 10^{11}$ | 80.1 |
| Comparative Example 2 | $1.3 \times 10^{11}$ | 77.5 |

EXAMPLE 2

(1) Preparation of porous particles of imido group-containing compound

In a 3-liter four-necked flask equipped with a thermometer, a stirrer and a moisture meter, 218 g (1 mole) of pyromellitic dianhydride and 1673 g of N-methyl pyrrolidone were placed and raised to a temperature of 50° C. with stirring while passing a nitrogen gas through the flask, followed by maintaining of the temperature at 50° C. for 0.5 hour to obtain a uniform solution. To this solution, 200 g (1 mole) of 4,4'-diaminodiphenyl ether and 3.6 g (2 moles) of water were added and raised to a temperature of 110° C. instantly, further raised to 200° C. in about 2 hours. The reaction was carried out at 200° C. for 3 hours. In the course of the procedure, deposition of particle-like polyimide was observed at about 125° C. Further, during the reaction, the water distilled was promptly removed out of the system. The resulting yellowish brown particles of polyimide dispersed in the N-methyl pyrrolidone were recovered by filtration, followed by boiling in acetone 2 times. The resulting particles were dried at 200° C. for 5 hours under reduced pressure. FIG. 6 is a photograph of a porous particle of the imido group-compound (3,000 magnifications). The resulting particles had an average particle size of 9 μm and a specific surface area of 40 m²/g. In the infrared absorption spectrum, the special absorption due to imido group at 1700 cm$^{-1}$ was admitted.

The treatment of liquid crystals with the porous particles of imido group-containing compound (2) obtained in above (1), the measurement of the degree of purification (resistivity) of the liquid crystals (3) and the measurement of voltage retention rate of liquid crystal cell were conducted in the same manner as described in Example 1. The results are shown in Table 2.

(5) Display ability of liquid crystal display device

The display ability was evaluated in the same manner as described in Example 1. The display properties (particularly display uniformity) were remarkably excellent.

TABLE 2

|  | Resistivity (Ω · cm) | Voltage retention rate (%) |
| --- | --- | --- |
| Example 2 | $1.2 \times 10^{12}$ | 85.5 |

EXAMPLE 3

(1) Preparation of porous particles of imido group-containing compound

In a 3-liter four-necked flask equipped with a thermometer, a stirrer and a moisture meter, 218 g (1mole) of pyromellitic anhydride and 1673 g of N-methyl pyrrolidone were placed and raised to a temperature of 50° C. with stirring, while passing a nitrogen gas through the flask, followed by maintaining the temperature at 50° C. for 0.5 hour to obtain a uniform solution. To this solution, 200 g (1 mole) of 4,4'-diaminodiphenyl ether and 3.6 g (2 moles) of water were added and raised to a temperature of 110° C. instantly, followed by maintaining at 110° C. for 20 minutes to give a uniform solution for complete dissolution. Then, the temperature was raised to 200° C. in about 2 hours and the reaction was carried out at 200° C. for 3 hours. In the course of the procedure, deposition of particle-like polyimide was observed at about 125° C. Further, during the reaction, the water distilled was promptly removed out of the system. The resulting yellowish brown particles of polyimide dispersed in the N-methyl pyrrolidone were recovered by filtration, followed by boiling in acetone 2 times. Then, the resulting particles were dried at 200° C. for 5 hours under reduced pressure. The resulting particles had an average particle size of 9 μm and a specific surface area of 40 m²/g (BET method, Sorptomatic 1800 type, mfd. by Carloerba Strumentazione). In the infrared absorption spectrum, the special absorption due to imido group at 1780 cm$^{-2}$ was admitted remarkably.

(2) Preparation of liquid crystal composition (Mixing of porous particles of imido group-containing compound and liquid crystals)

The porous particles of imido group-containing compound obtained in above (1) in an amount of $1.3 \times 10^{-8}$ g were charged into a 10-ml beaker containing 5 g of liquid crystals (ZLI-4792, a trade name, mfd. by Merck Japan Ltd.) and stirred well to give a liquid crystal composition.

(3) Measurement of voltage retention rate of liquid crystal cell

The voltage retention rate was measured in the same manner as described in Example 1 (4) except for inserting the liquid crystal composition obtained in above (2) into a cavity between two substrates of liquid crystal cell by a vacuum impregnation method.

(4) Display ability of liquid crystal display device

An active driving type liquid crystal display device was formed by using the liquid crystal composition obtained in above (2) and a polyimide (Active Matrix type orientation film LQ-T 210, a trade name, mfd. by Hitachi Chemical Co., Ltd.) as an orientation film. Display properties (particularly display uniformity) were remarkably excellent.

COMPARATIVE EXAMPLE 3

The process of Example 3 was repeated except for forming a liquid crystal cell using only the liquid crystals without using the porous particles of imido group-containing compound.

The results are shown in Table 3.

TABLE 3

| | Voltage retention rate (%) |
|---|---|
| Example 3 | 98.2 |
| Comparative Example 3 | 96.7 |

EXAMPLE 4 AND COMPARATIVE EXAMPLE 4

The liquid crystal cells obtained in Example 3 and Comparative Example 3 were allowed to stand at a high temperature of 80° C. and taken out after certain periods. Then, the voltage retention rate was measured and listed in Table 4.

TABLE 4

| Example No. | Voltage retention rate (%) | | | |
|---|---|---|---|---|
| | 100 hrs. | 200 hrs. | 500 hrs. | 1000 hrs. |
| Example 4 | 98.1 | 98.0 | 98.0 | 97.5 |
| Comparative Example 4 | 94.0 | 90.5 | 83.7 | 75.2 |

As shown in Table 4, the voltage retention rate of Example 4 is as high as 97.5% even after 1000 hours at 80° C., while that of Comparative Example 4 is lowered to 75.2%. This means that display stability at high temperatures can be obtained according to the present invention.

As mentioned above, according to the present invention, since a sufficient purifying effect can be obtained by only using a small amount of porous particles of imido group-containing compound, the losing amount of precious liquid crystals during purification, e.g. a loss by trapping on a liquid crystal purifying agent, can be reduced. Further, since the thus purified liquid crystals or the liquid crystal composition containing such porous particles of imido group-containing compound can provide liquid crystals and liquid crystal compositions having long-period display stability and long period display stability under high temperature circumstances, liquid crystal cells and liquid crystal display devices containing these liquid crystals or liquid crystal compositions are excellent in display properties.

What is claimed is:

1. A process for producing purified liquid crystals which comprises contacting liquid crystals with porous particles of imido group-containing compound; said porous particles having an average particle size of 0.1 to 5000 $\mu$m and a specific surface area of 1 $m^2/g$ or more.

2. A process according to claim 1, wherein the porous particles of imido group-containing compound are porous particles of polyimide obtained by reacting a tetracarboxylic dianhydride with a diamine in a solvent which does not dissolve the particular polyimide.

3. A process according to claim 1, wherein the porous particles of imido group-containing compound are porous particles of polyimide obtained by reacting a tetracarboxylic dianhydride with a diisocyanate in a solvent which does not dissolve the particular polyimide.

4. A process according to claim 1, wherein the porous particles of imido group-containing compound are porous particles of polyimide obtained by uniformly dissolving almost equimolar amounts of an aromatic tetracarboxylic dianhydride and an aromatic diamine and 10 to 200% by mole water per mole of the tetracarboxylic dianhydride in a basic solvent at a temperature below 150° C., and carrying out the reaction at 150° to 300° C.

5. In a liquid crystal cell, the improvement wherein the purified liquid crystals obtained by the process of claim 1 are used.

6. In a liquid crystal display device, the improvement wherein the purified liquid crystals obtained by the process of claim 1 are used.

7. A liquid crystal composition comprising one or more liquid crystals and porous particles of imido group-containing compound said porous particles having an average particle size of 0.1 to 5000 $\mu$m and a specific surface area of 1 $m^2/g$ or more.

8. In a liquid crystal cell, the improvement wherein the liquid crystal composition of claim 7 is used.

9. In a liquid crystal display device, the improvement wherein the liquid crystal composition of claim 7 is used.

* * * * *